No. 667,749. Patented Feb. 12, 1901.
J. R. UECKERT.
CHUCK FOR COILING STUD SPIRALS.
(Application filed June 30, 1900.)

(No Model.)

Witnesses
F. E. Alden
[signature]

J. R. Ueckert Inventor
by C. A. Snow & Co.
Attorneys

UNITED STATES PATENT OFFICE.

JOHN R. UECKERT, OF GEORGETOWN, TEXAS, ASSIGNOR OF ONE-HALF TO PETTUS G. SECREST, OF SAME PLACE.

CHUCK FOR COILING STUD-SPIRALS.

SPECIFICATION forming part of Letters Patent No. 667,749, dated February 12, 1901.

Application filed June 30, 1900. Serial No. 22,229. (No model.)

*To all whom it may concern:*

Be it known that I, JOHN R. UECKERT, a citizen of the United States, residing at Georgetown, in the county of Williamson and State of Texas, have invented a new and useful Chuck for Coiling Stud-Spirals, of which the following is a specification.

This invention relates to lathe-chucks, and is especially designed to provide an improved chuck for jewelers' use and for coiling stud-spirals and the like.

Ordinarily coiled studs and settings come separate, so that any jewel or stone may be placed in the setting, and afterward the coiled stud is soldered to the back of the setting. In soldering the coiled stud to the setting the heat frequently destroys the temper of the coils, so that an inferior article is produced.

In view of the foregoing statement of facts the present invention has been designed to provide an improved chuck for application to a jeweler's lathe, so that a straight wire may be conveniently formed into a spiral stud after said wire has been soldered to the setting. It is furthermore designed to provide a sectional chuck which is arranged to facilitate the application of the wire thereto and also provided with means for conveniently adjusting the chuck to wires of different sizes.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
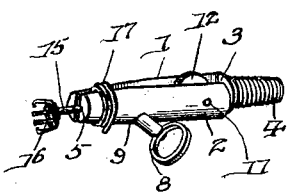
Figure 2:
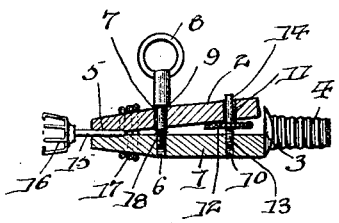
Figure 3:
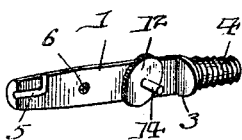

In the drawings, Figure 1 is a perspective view of a chuck constructed in accordance with the present invention and holding a spiral stud formed thereon. Fig. 2 is a central longitudinal sectional view thereof. Fig. 3 is a detail perspective view of one of the sections of the chuck.

Corresponding parts are designated by like characters of reference in all of the figures of the drawings.

Referring to the drawings, 1 and 2 designate the respective sections or members of the present form of chuck, each of which is solid and of a semicylindrical form. At the rear end of the section 1 and projecting at the inner or flat side thereof is a transverse shoulder 3, which is preferably circular in form and of substantially the same diameter of the chuck. Extending rearwardly from the center of this shoulder is a screw-threaded shank or stem 4 for connection with a lathe. The outer side of the forward portion of the section is tapered inwardly and forwardly, and in the inner flat face of the section there is provided a substantially L-shaped groove 5, one member or branch of which extends longitudinally of the section and opens outwardly through the front end thereof, while the other branch is disposed transversely of the section and opens laterally outward through one side thereof. The longitudinal branch of the groove is disposed midway between the opposite edges of the flat side of the section, and the other section is provided with a corresponding L-shaped groove to coöperate with the former groove, so as to receive and hold the wire for the formation of the coiled stud, as will be hereinafter explained. The other section 2 is a substantial duplicate of the section 1, with the exception of the shoulder and the attaching-stem, so that the flat faces of the sections are designed to lie in mutual engagement with the rear end of the section 2 abutting against the forward side of the shoulder 3. Both sections are provided with intermediate corresponding perforations 6 and 7, that extend transversely through each section and open inwardly through the flat face thereof. The perforation 6 in the section 1 is smaller than the opposite perforation 7 and is also screw-threaded for the reception of the screw-threaded portion of the shank of a set-screw 8, whereby the two sections may be adjusted toward and away from each other. The shank of the set-screw is provided with an outwardly-directed annular shoulder 9 to bear against the adjacent outer face of the section 2, so as to draw the latter toward the other other section when the screw is set inwardly.

Adjacent to the rear end of the chuck the members thereof are provided with the corresponding transverse perforations 10 and 11, which are parallel with the other perforations, the perforation 10 being screw-threaded and the other being smooth and larger than the former. Located between the two sections is a thumb-nut 12, which is provided with the concentric oppositely-disposed spindles 13 and 14, of which the spindle 13 is screw-threaded to fit the screw-threaded perforation in the section 1, and the opposite spindle is smooth and smaller than the perforation in the section 2, so that the latter may rock thereon. The thumb-nut 12 or disk-like head of the clamping-screw is slightly greater in diameter than the chuck, so that the peripheral edge thereof may project at diametrically opposite points, and is milled or roughened to form a surface for convenient engagement by the fingers of the operator to turn the screw, so as to force the rear ends of the sections apart or to permit them to come together, according to the adjustment of the screw.

In the employment of the present device a straight wire 15 has one end soldered to the back of a setting 16, after which the wire is tempered and burnished. The wire is then bent laterally at right angles and into substantially L shape, so as to form a straight shank portion 15 of sufficient or desired length. This shank portion is then placed in the longitudinal branch of the L-shaped groove in the chuck-section 1, so that the remaining longer portion may extend outwardly through the lateral portion of the groove. The section 2 is then placed in position, so as to receive the wire in the L-shaped groove, with the set-screw 8 registering with the screw-threaded perforation 6 and with the unthreaded portion of the spindle of the clamping-nut 12 received within the perforation 11, after which the set-screw is adjusted to draw the sections together upon the wire, and then the binding-screw is adjusted to tilt the forward end of the section 2 inwardly, so that the chuck may be bound more firmly upon the wire. The wire thus being fixedly held the free portion thereof is wound upon the spiral-forming mandrel provided by the tapered portion of the chuck, so as to form the spiral stud 17, when the sections may be loosened, so as to permit of the removal of the completed stud. By this means a straight wire may be conveniently soldered to a setting and then tempered and burnished, after which the wire may be formed into a spiral stud having the required temper.

A suitable coiled spring 18 encircles the shank of the set-screw 8 and bears in opposite directions against the chuck-sections, so as to normally tend to separate the same. By this means the outer ends of the sections may be normally separated by the tension of the spring, so as to permit of the wire being inserted therebetween without necessitating the separation of the sections.

What is claimed is—

1. A chuck of the class described, comprising opposite sections, having corresponding substantially L-shaped grooves formed in the inner faces thereof, one branch of each groove being disposed centrally and longitudinally of the respective section and opening outwardly through the forward end thereof, and the other branch extending transversely across the section and opening laterally outward through one side thereof, and means for clamping the sections together.

2. A spiral-forming chuck for jewelers' lathes, having a lathe connection at one end, and a pair of wire-gripping jaws at the opposite end thereof, the inner faces of the jaws having corresponding longitudinal grooves opening outwardly through the outer ends thereof, and corresponding transverse grooves which intersect the respective longitudinal grooves and open laterally outward through corresponding sides of the jaws, the exterior of the latter providing a spiral-forming mandrel.

3. A chuck of the class described, comprising opposite sections, intermediately-disposed means for drawing the sections together, and an adjusting device, consisting of a set-screw, having an intermediate head located between the two members or sections, one portion of the shank of the screw being screw-threaded and engaging a correspondingly-threaded perforation in one of the sections, and the opposite portion of the shank being smooth and loosely received within a smooth perforation in the other section.

4. A chuck of the class described, comprising opposite sections, one of the latter having a lateral shoulder at one end, and an attaching-stem extending longitudinally outward from the shoulder, the other section having one end abutted against the shoulder, and means for drawing the sections together.

5. A chuck of the class described, comprising opposite sections, which are semicylindrical in shape and are tapered at their forward ends, one of the sections having an intermediate screw-threaded perforation, a similar threaded perforation near the rear end thereof, a lateral shoulder at the rear end of the section, and an attaching-stem projecting outwardly from the shoulder, the other section having its rear end abutted against the forward side of the shoulder, and also provided with smooth perforations corresponding to the threaded perforations of the first section, a set-screw engaging the corresponding intermediate perforations, and an adjusting-screw, having a threaded shank portion engaging the rear threaded perforation of the first-mentioned section, an opposite unthreaded shank portion for the corresponding smooth perforation, and an intermediate head located between the two sections and projecting at diametrically opposite sides thereof.

In testimony that I claim the foregoing as my own I have hereto affixed my signature in the presence of two witnesses.

JOHN R. UECKERT.

Witnesses:
R. A. BRENEKE,
J. L. PRICE.